United States Patent
Fevre

(10) Patent No.: US 10,549,473 B2
(45) Date of Patent: Feb. 4, 2020

(54) DEVICE FOR SERIAL TREATMENT OF HOLLOW BODIES COMPRISING A TREATMENT ROD SLIDINGLY CONTROLLED BY AN ELECTRIC ACTUATOR AND TREATMENT METHOD

(71) Applicant: SIDEL PARTICIPATIONS, Octeville sur Mer (FR)

(72) Inventor: Sebastien Fevre, Octeville sur Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 337 days.

(21) Appl. No.: 15/102,396

(22) PCT Filed: Dec. 4, 2014

(86) PCT No.: PCT/EP2014/076530
§ 371 (c)(1),
(2) Date: Jun. 7, 2016

(87) PCT Pub. No.: WO2015/086423
PCT Pub. Date: Jun. 18, 2015

(65) Prior Publication Data
US 2016/0311148 A1    Oct. 27, 2016

(30) Foreign Application Priority Data
Dec. 9, 2013  (FR) ...................... 13 62291

(51) Int. Cl.
*B29C 49/78* (2006.01)
*B29C 49/64* (2006.01)
(Continued)

(52) U.S. Cl.
CPC .......... *B29C 49/78* (2013.01); *B29C 49/4252* (2013.01); *B29C 49/6445* (2013.01);
(Continued)

(58) Field of Classification Search
CPC . B29C 49/78; B29C 49/6445; B29C 49/4252; B29C 2949/78563;
(Continued)

(56) References Cited

U.S. PATENT DOCUMENTS 6,984,360 B1     1/2006   Feuilloley et al.
2011/0037189 A1*  2/2011  Balkau .................... B29C 49/78
                                                          264/40.3

FOREIGN PATENT DOCUMENTS

DE    43 05 478 A1    8/1994
EP     2 176 052 A2   4/2010
WO    2009/037396 A2  3/2009

OTHER PUBLICATIONS

International Search Report, dated Feb. 10, 2015, from corresponding PCT Application.

* cited by examiner

*Primary Examiner* — Robert J Grun

(57) ABSTRACT

A device (30) for serial treatment of hollow bodies including: a transport member (32); a treatment rod (38) mounted slidably relative to the transport member (32); controlled elements for moving each treatment rod (38) between a retracted position and an extended position in which the treatment rod (38) is intended for being inserted axially into the transported hollow body; wherein the controlled elements consist of an electric actuator (42) controlled by an electronic control unit (44) for stopping the treatment rod (38) in the extended position thereof. A method for serial treatment of preforms using the treatment device is also described.

12 Claims, 2 Drawing Sheets

(51) Int. Cl.
*B29C 49/42* (2006.01)
*B29K 67/00* (2006.01)
*B29L 31/00* (2006.01)

(52) U.S. Cl.
CPC .............. *B29C 2949/78067* (2013.01); *B29C 2949/78563* (2013.01); *B29K 2067/003* (2013.01); *B29L 2031/7158* (2013.01)

(58) Field of Classification Search
CPC ....... B29C 2949/78067; B29C 49/6436; B29L 2031/7158; B29K 2067/003
See application file for complete search history.

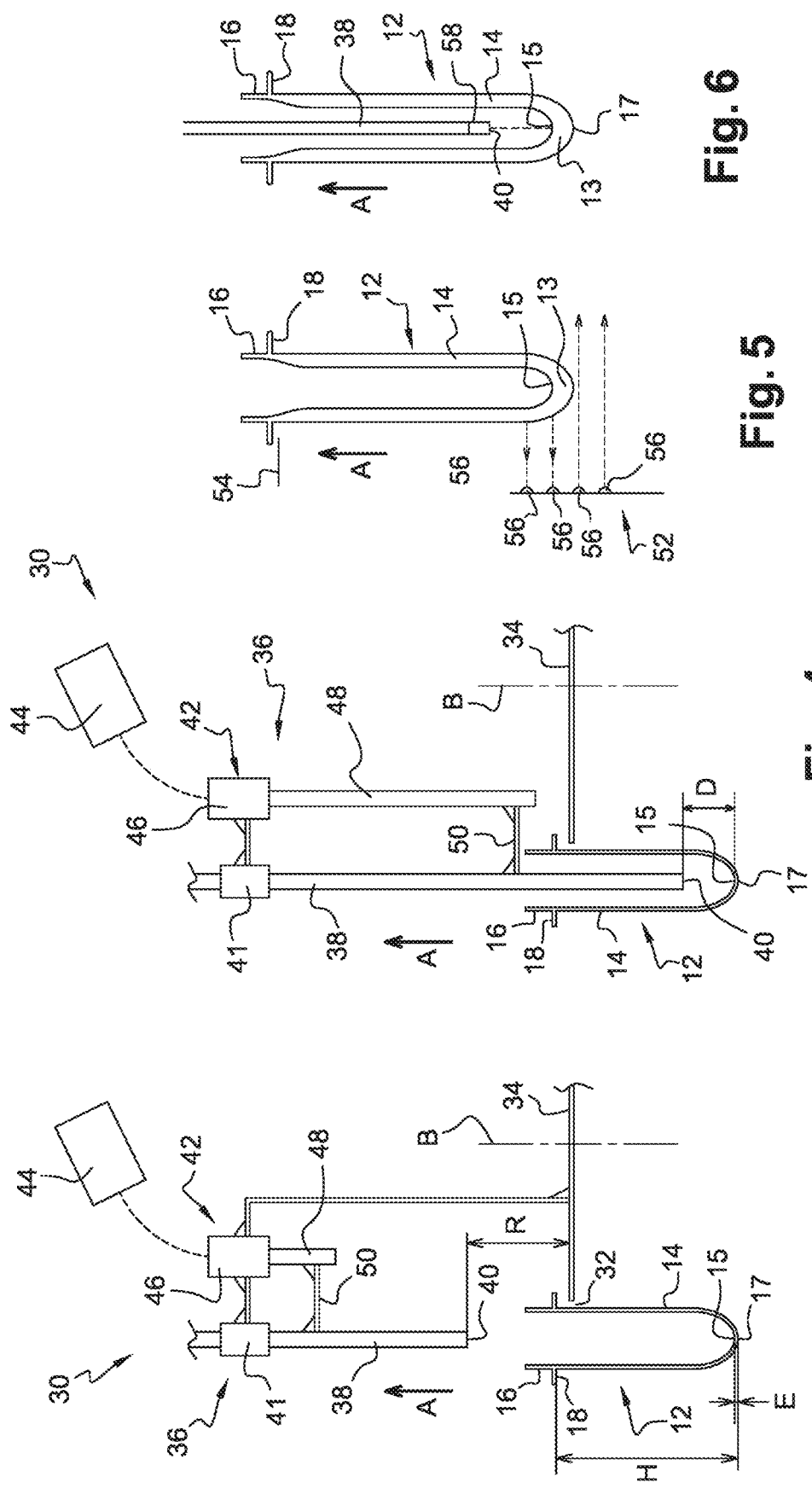

DEVICE FOR SERIAL TREATMENT OF HOLLOW BODIES COMPRISING A TREATMENT ROD SLIDINGLY CONTROLLED BY AN ELECTRIC ACTUATOR AND TREATMENT METHOD

TECHNICAL FIELD OF THE INVENTION

The invention relates to a device for serial treatment of hollow bodies made of thermoplastic material comprising a treatment rod that is designed to be inserted into the hollow body, with the device relating to sliding control means of the rod.

The invention also relates to a method for serial treatment of preforms using such a treatment device.

TECHNICAL BACKGROUND OF THE INVENTION

The invention relates more particularly to a device for serial treatment of hollow bodies made of thermoplastic material, in particular preforms made of thermoplastic material, comprising:
- At least one individual transport element of a hollow body;
- At least one treatment rod that is associated with said transport element, with the treatment rod being mounted to slide axially in relation to the transport element;
- Controlled means for moving each treatment rod between a retracted position in which the treatment rod is retracted above the hollow body transported by the transport element and an extended position in which the treatment rod is designed to be inserted axially into the hollow body transported by passing through a neck of said hollow body.

The treatment devices of this type make it possible in particular to treat preforms that are designed for the manufacture, by blow molding or by stretch blow molding, of containers made of thermoplastic material.

In the description and in the claims, the term "treatment" encompasses both physical intervention operations on the hollow body, such as a sterilization or cooling operation, and control operations, such as an operation for measuring the temperature inside the hollow body.

In this type of device, the transport elements move by traveling one after the other along a closed circuit. The transport elements are carried by, for example, a chain or carrousel.

The hollow bodies are loaded one by one on the device in a loading zone. Then, they are moved by the transport elements along a path. During their transport, the hollow bodies are treated. At the end of the path, the hollow bodies are unloaded from the transport elements one after the other in an unloading zone.

When they are preforms, the hollow bodies continue their movement on other devices in the direction of a shaping station, while the transport elements return to their starting point to pick up other hollow bodies to be treated.

In the treatment devices that are already known, the sliding of the treatment rods is controlled by a cam that is arranged along the path of the hollow body.

The cam sliding means are generally very bulky. To make it possible to reduce the span between two successive transport elements, multiple treatment rods are mounted on the same sliding carriage. Thus, all of the rods that are mounted on said carriage are slid simultaneously in such a way as to treat multiple hollow bodies at the same time.

However, the cam sliding control means do not make it possible to adjust the sliding travel of the treatment rods quickly and easily. It is not possible in particular to adjust individually the sliding travel of each rod based on the size of each hollow body during the operation of the treatment device.

In addition, the fact that multiple rods are controlled simultaneously does not make it possible to treat the hollow bodies over their entire path. Actually, in considering a series of multiple successive hollow bodies designed to be treated by an equal number of treatment rods mounted on a common carriage, the first hollow bodies of the series should first of all execute a "vacuum" movement, i.e., without treatment, until the last hollow body of the series is loaded on the treatment device before the treatment can begin. Likewise, the treatment stops simultaneously for all of the hollow bodies of the series as soon as the first hollow body has reached the unloading zone.

The presence of these "vacuum" movements unnecessarily increases the duration of the presence of each hollow body on the treatment device.

Treatment devices are also known in which the control means of the sliding of rods consist of pneumatic cylinders that operate on an "all-or-nothing" basis. The sliding travel of each treatment rod is adjusted simultaneously for all of the treatment rods of the device by the positioning of a stop element common to all of the cylinders. This device makes it possible to roughly adjust the travel of the treatment rods for different types of hollow bodies.

Nevertheless, the common adjustment of the travel of the treatment rods does not make it possible to obtain a fine adjustment making it possible to adapt specifically the travel of each rod to the actual height of each hollow body. This is important in particular when the treatment device is arranged after a station for heating hollow bodies. Actually, the heating brings about a withdrawal of the thermoplastic material that constitutes the hollow bodies. The effect of this withdrawal over the height of the hollow bodies is on the order of several millimeters. In addition, the withdrawal is separate for each preform, and it is very complicated, and even impossible, to determine the exact height of a preform after the heating thereof.

However, certain treatments require a fine adjustment of the travel of the treatment rods during the operation of the treatment device to be able to adapt it to the height of each preform taken individually. Such an adaptation cannot be achieved by the known treatment devices.

BRIEF SUMMARY OF THE INVENTION

The invention proposes a treatment device of the type described above, characterized in that the controlled means consist of an electric actuator, with the interruption of the operation of the electric actuator being controlled individually by an electronic control unit for stopping the associated treatment rod in its extended position.

According to other characteristics of the device produced according to the teachings of the invention:
- The device comprises a number of transport elements, each of which is associated with a treatment rod, with each treatment rod being moved individually by an associated individual electric actuator;
- The device comprises means for controlling the sliding travel of the treatment rod to its extended position so that, in its extended position, a free end of the treatment rod is stopped at a determined axial distance from a bottom of the hollow body regardless of the axial dimension of the hollow body;

The control means comprise means for measuring the axial height of said hollow body;

The treatment rod comprises means for detecting when its free end is at the determined distance from the bottom of the preform;

The treatment rod consists of a nozzle designed to inject a fluid into the hollow body;

The treatment rod carries at its rear end a means for measuring the temperature;

The treatment rod comprises means for emission of sterilizing electromagnetic radiation, for example electroluminescent diodes emitting ultraviolet radiation.

The invention also relates to a method for serial treatment of preforms made of thermoplastic material at the end of a preliminary heating operation of the preforms, with the method using the treatment device according to the invention, characterized in that it comprises stages for individual treatment of each preform by insertion of the treatment rod into each preform up to its extended position, with the travel of the treatment rod being adapted to each of the preforms by the control means so that the free end of the treatment rod is stopped at the determined distance from the bottom of the preform.

According to other characteristics of the method:

The method comprises preliminary stages for measuring the height of each hot preform, with each preliminary stage for measuring a preform taking place before the beginning of the treatment stage of said preform to make it possible for the electronic control unit to stop the treatment rod at the determined distance from the bottom of said preform;

Each treatment stage comprises an operation for detecting the bottom of said preform that is produced during the sliding of the treatment rod toward its extended position to make it possible for the electronic control unit to stop the treatment rod at the determined distance from the bottom of said preform.

BRIEF DESCRIPTION OF THE FIGURES

Other characteristics and advantages of the invention will emerge during the reading of the detailed description that will follow for the understanding of which reference will be made to the accompanying drawings in which:

FIG. 3 is a diagrammatic partial axial cross-sectional view of FIG. 2 in which a treatment rod occupies a retracted position;

FIG. 4 is a diagrammatic partial axial cross-sectional view of FIG. 2 in which a treatment rod occupies an extended position;

FIG. 5 is a diagrammatic profile view that shows means for measuring the height of a preform;

FIG. 6 is a view similar to the one of FIG. 5 that shows a treatment rod that is equipped with means for detecting when the bottom of the preform is approached.

DETAILED DESCRIPTION OF THE FIGURES

In the description below, elements having an identical structure or analogous functions will be referred to by identical reference signs.

In the description below, an axial orientation that is directed from the bottom up in a direction parallel to that of the sliding axis of the treatment rods and indicated by the arrow "A" of the figures will be adopted in a nonlimiting manner.

Figure 1:
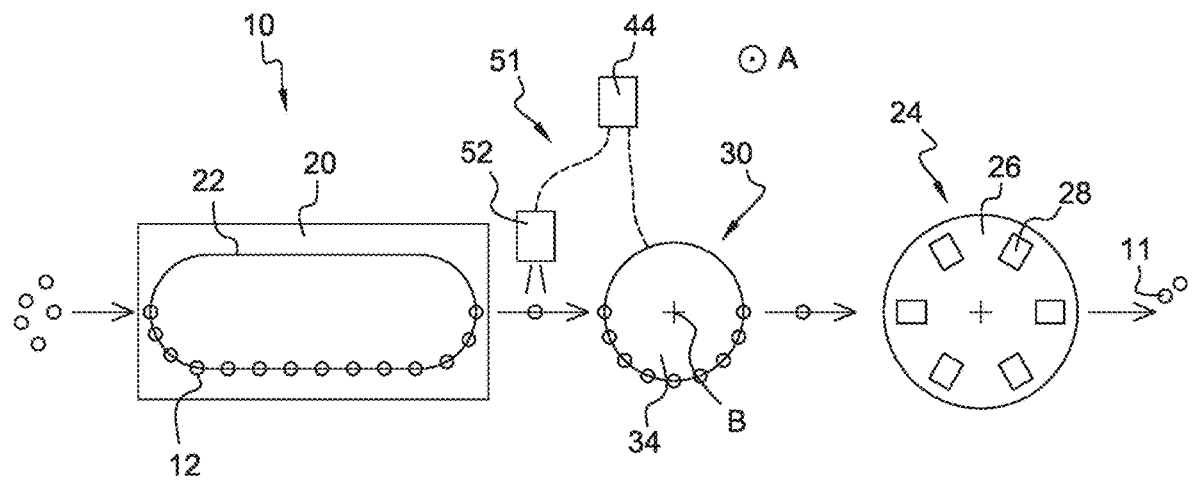
FIG. 1 is a diagrammatic view that shows an installation for serial manufacturing of containers by shaping preforms made of thermoplastic material, with the installation comprising a treatment device produced according to the teachings of the invention.

FIG. 1 shows diagrammatically an installation 10 for serial manufacturing of containers made of thermoplastic material. In a nonlimiting manner, the containers here are bottles, and the thermoplastic material is formed by polyethylene terephthalate, referred to below by its acronym "PET."

The containers are obtained by hot-forming preforms 12 made of thermoplastic material.

For the description and for the claims, the term "hollow body" relates to a hollow object that has an opening formed by a neck. In this description, the hollow bodies consist of preforms 12.

Such preforms 12 are obtained generally by injection. As shown in FIG. 5, they have a cylindrical body 14 with a tubular wall that is closed at one of its axial ends, here the lower end, by a base 13 and that is extended at its other end, here the upper end, by a neck 16, itself also tubular.

The neck 16 is axially delimited in the downward direction by a collar 18. The neck 16 is generally injected in such a way as to already have its final shape while the body 14 of the preform 12 is called upon to undergo relatively significant deformation for shaping the final container during a shaping operation.

The base 13 of the preform 12 thus forms a wall that has an inside face shaping a bottom 15 that axially delimits in the downward direction the inside cavity of the preform 12 and an outside face 17.

By referring to FIG. 1, the installation 10 comprises a station 20 for heating preforms 12. By way of nonlimiting example, the heating station 20 consists of a tunnel in which are arranged heating means (not shown), such as infrared lamps or emission means of microwave radiation. A means 22 for conveying preforms 12 is arranged in such a way as to move the preforms 12 along heating means from an entrance to an exit from the tunnel.

The direction of movement of the preforms 12 is indicated by the arrows of FIG. 1.

As a variant, the heating station consists of individual cavities equipped with heating means and each accommodating a preform.

At their exit from the heating station 20, the parts of the preforms 12 to be deformed, generally the body 14, are made malleable by heating to above a glass transition temperature, while the parts that are not to be deformed, in general the neck 16, are kept at a low enough temperature to preserve their original shape.

The installation 10 also comprises a station 24 for shaping preforms 12 that is thus heated. The shaping station 24 is arranged downstream from the heating station in reference to the stream of preforms 12 in the installation 10.

The shaping station 24 has here the form of a carrousel 26 that carries a number of shaping stations 28. Each shaping station 28 is thus able to move around the axis of the carrousel 26 between a loading point of the hot preforms 12 and an unloading point of the final containers before taking up a new cycle.

These are stations 28 for shaping the preforms 12 by stretch blow molding. Concerning stations 28 for shaping by blow molding, the fluid generally consists of a pressurized gas.

It will be understood, however, that the invention can also be applied to other types of shaping stations, in particular to stations for shaping by injection of a pressurized liquid into the preform.

During the operation for shaping containers, the carrousel 26 is driven by a rotational movement to make possible the movement of the preforms 12/final containers from the loading point to the unloading point. Thus, a new preform 12 can begin the shaping operation while the preceding preform 12 has not yet completed its shaping cycle. This makes it possible to maintain a fast pace for mass production of containers 12.

The manufacturing installation 10 also comprises a device 30 for serial treatment of preforms 12 that is inserted between the heating station 20 and the shaping station 24 along the stream of preforms 12.

The treatment device 30 comprises at least one element 32 for individual transport of a preform 12.

Figure 2:
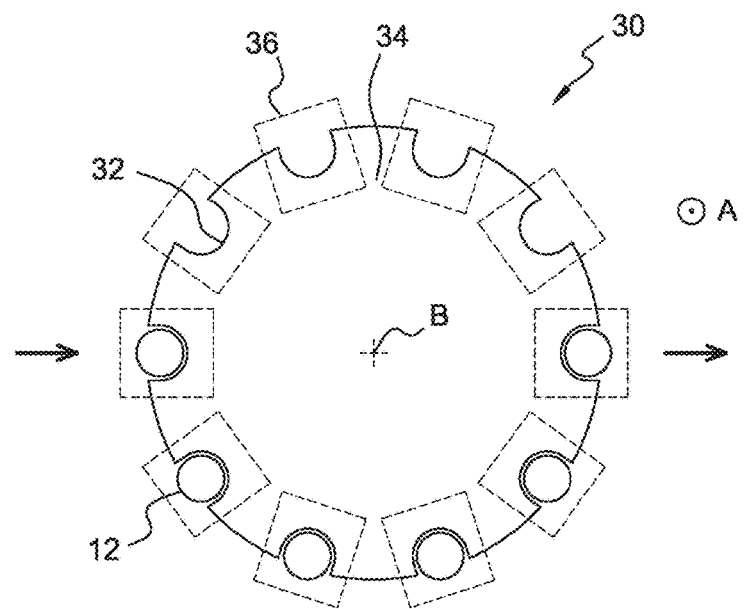
FIG. 2 is a diagrammatic top view that shows a portion of the treatment device of FIG. 1 comprising elements for transport of hollow bodies.

The treatment device 30 shown in FIG. 2 more particularly comprises a transport wheel 34 that is mounted to rotate around an axis "B" of axial orientation. On its periphery, the transport wheel 34 comprises slots, each of which forms an individual transport element 32. As shown in FIG. 3, each slot has suitable dimensions so that the collar 18 of a preform 12 is placed on the periphery of the slot. Thus, the preforms 12 can be transported along a path in the shape of an arc when the transport wheel 34 is driven in rotation by a motor (not shown) from a loading zone to an unloading zone.

As a variant of the invention, not shown, each transport element consists of a clamp that can grip the preform, for example by clamping the external cylindrical wall of the neck of the preform while leaving the neck accessible to a treatment rod 38 as will be explained below.

As shown by broken lines in FIG. 2, each transport element 32 is associated with a treatment station 36 that is integral in movement with said associated transport element 32.

The treatment device 30 comprises here a number of transport elements 32, each of which comprises an associated treatment station 36 for serial treatment of the preforms 12 at a high rate.

The treatment stations 36 are identical in their structure and in their arrangement in relation to the transport element 32 with which they are associated.

As is illustrated in FIG. 3, each treatment station 36 comprises an axial treatment rod 38 that comprises a free lower end 40.

The free lower end 40 of the treatment rod 38 is designed to be inserted axially into the preform 12 by passing through the neck 16. For this purpose, the treatment rod 38 is arranged axially on a level with the opening of the neck 16 of the preform 12 carried by the transport element 32.

The treatment rod 38 is mounted to slide in relation to the transport wheel 34 between:

A retracted position, as illustrated in FIG. 3, in which the treatment rod 38 is retracted above the transported hollow body, here the preform 12, and;

An extended position, as illustrated in FIG. 4, in which the treatment rod 38 is inserted by axial sliding in the downward direction into the preform 12 transported by the transport element 32.

The sliding of the treatment rod 38 is guided by a guide means, such as a sleeve 41, which is stationary in relation to the transport wheel 34.

In its retracted position, the free end 40 of the treatment rod 38 is arranged axially above the neck 16 of the preform 12 in such a way as to make possible the lateral loading, i.e., in a direction that is orthogonal to the axial direction, of a new preform on the transport element 32, or the lateral unloading of an already treated preform 12.

In its extended position, the free end of the treatment rod 38 is stopped at a determined axial distance "D" from the bottom of the preform 12.

Each treatment station 36 comprises controlled means of moving the treatment rod 38 between its retracted position and its extended position.

According to the teachings of the invention, the controlled means of movement consist of an electric actuator 42, the interruption of the operation of which is controlled by an electronic control unit 44, illustrated in FIG. 1, for stopping the treatment rod 38 in its extended position.

The electric actuator 42 comprises a static element 46 that is mounted in a stationary manner in relation to the transport wheel 34, and a movable element 48 that can move axially parallel to the treatment rod 38. The movable element 48 is driven by an electric motor (not shown).

The supply with electric current of the electric motor is controlled individually by the electronic control unit 44.

The treatment rod 38 is fixed mechanically with the movable element 48 by means of a flange 50. Thus, the treatment rod 38 is integral in axial movement with the movable element 48.

By way of nonlimiting examples, the electric actuator 42 consists of a linear electric motor or a tubular electric cylinder, or else a so-called "brushless" worm gear motor.

It will be understood by the terms "controlled interruption of operation" that the stopping of the treatment rod 38 in its extended position is carried out without contact with a mechanical stop. In other words, the stopping of the treatment rod 38 in its extended position is carried out by interruption of the supply of electric current to the electric actuator 42 controlled by the electronic control unit 44.

As shown in FIGS. 3 and 4, each treatment rod 38 is actuated individually by an associated individual electric actuator 42. Thus, the movable element 48 of each electric actuator 42 is linked with a single associated treatment rod 38.

In addition, each electric actuator 42 is controlled individually by the electronic control unit 44. In other words, each electric actuator 42 is controlled independently of other electric actuators 42 of the device.

According to a first application of the invention, the treatment rod 38 carries on its free lower end 40 a means (not shown) for measuring the temperature inside the preform, for example a temperature sensor. Thus, in the extended position of the treatment rod 38, the temperature sensor can measure the temperature prevailing inside the preform 12 at the determined distance "D" from the bottom 15 of the preform 12.

Such a treatment rod 38 is used in particular at the exit from the heating station 20 to verify that the preforms 12 have indeed been heated to a target temperature.

As a variant, the treatment rod is in addition stopped in at least one intermediate position between its retracted position and its extended position to be able to measure the temperature prevailing inside the preform at a second distance from the bottom of the preform that is greater than the determined distance.

According to a second application of the invention, the treatment rod 38 consists of a nozzle that comprises at its free lower end 40 at least one opening for injecting a fluid, for example a gas. The treatment rod 38 is thus able to inject fluid into the preform 12 when it occupies its extended position.

Such a treatment rod 38 can be used to cool certain portions of the wall of the preform 12 on its exit from the heating station 20. This makes it possible in particular to create a determined heating profile of the body 14 of the preform 12, i.e., the body 14 of the preform 12 is not heated in a homogeneous manner. Thus, it is possible to promote the deformation of the hotter parts of the preform 12 during the shaping operation, while the colder parts of the preform 12 are less deformed. Such a method, called "preferred heating," makes it possible to obtain final containers having a complex shape.

For this application, fluid jets can be oriented radially in relation to the axis of the preform 12. This use requires a specific positioning of the treatment rod 38 in the extended position in relation to the bottom 15 of the preform 12 so that the heating profile of the preform 12 is controlled.

According to a third application of the invention, the treatment rod comprises emission means of a sterilizing electromagnetic radiation, for example electroluminescent diodes emitting ultraviolet radiation. Such emission means are arranged, for example, at the free end 40 of the treatment rod 38.

A sterilization treatment carried out with such a treatment rod 38 is all the more effective since the emission means of the radiation are arranged close to the wall portion of the preform 12 to be sterilized. Actually, it is known that the intensity of the electromagnetic radiation decreases as the square of the distance between the emission source and the wall to be sterilized. Thus, the sterilization of the bottom 15 of the preform 12 will be effective all the more quickly since the free end 40 of the treatment rod 38 will be close to it.

It is necessary, however, to be careful that the end of the treatment rod 38 does not come into contact with the bottom 15 of the preform 12 at the risk of damaging the preform 12 and/or the emission means of the radiation.

The three applications described above require a specific positioning of the treatment rod 38 in the extended position in such a way that the free end 40 of the treatment rod 38 is stopped specifically at the determined distance "D" from the bottom 15 of the preform 12.

However, it was noted that at the end of their heating by the heating station 20, the preforms 12 made of thermoplastic material, and in particular of polyethylene terephthalate, undergo a withdrawal. This withdrawal is reflected in particular by a decrease in the axial height of the preform 12 that can range up to several millimeters. For a lot of identical preforms 12 before their heating, the decrease in height of each preform 12 is separate.

Consequently, the extended position of the treatment rod 38 is to be defined individually for each of the preforms 12 so that the determined distance "D" between the free end 40 of the treatment rod 38 and the bottom 15 of the preform 12 is specifically maintained for each of the preforms 12.

For this purpose, the treatment device 30 comprises means for controlling the sliding travel of the treatment rod 38 to its extended position based on the position of the bottom 15 of the preform 12 in the transport element 32 so that in its extended position, the free end 40 of the treatment rod 38 is stopped at the determined distance "D" from the bottom 15 of the preform 12 regardless of the axial dimension of the preform 12. Thus, the sliding travel of the treatment rod 38 from its retracted position to its extended position is adapted to the actual size of the associated preform 12.

The retracted position of the treatment rod 38 is fixed in an identical manner, regardless of the preform 12 loaded on the corresponding transport element 32, while the extended position can change based on the actual dimensions of the preform 12 loaded on the corresponding transport element 32.

According to a first embodiment of the invention, the control means comprise means 52 for measuring the axial height of said preform 12. The measuring means 52 are arranged in such a way as to measure the height of the preform 12 before the treatment rod 38 is inserted therein.

The height of the preform 12 is defined here as the axial dimension between the collar 18 and the outside face 17 of the base 13.

The measuring means 52 are able to communicate the result of the height measuring of the preform 12 to the electronic control unit 44.

In the example shown in FIG. 1, the measuring means 52 are arranged in such a way as to measure the height of the preforms 12 before their loading on the transport elements 32.

As a variant, the measuring means are arranged in such a way as to measure the height of the preforms after their loading on the transport elements. The measuring means are, for example, mounted on the transport wheel.

In the example shown in FIG. 5, the preform 12 is carried by a gripping element 54 that is similar to the transport element of the treatment device 30. The gripping element 54 moves in a known reference plane that makes it possible to know the specific position of the collar 18 of the preform 12.

The measuring means 52 consist here of optoelectronic cells 56 operating according to a so-called "barrier" or "through beam" mode. The cells 56 are arranged in a stationary manner along the path of the preforms 12, in a column, with a determined span separating two adjacent cells 56. Each cell 56 is arranged at a determined axial distance from the collar 18 of the preform 12.

The optoelectronic cells 56 are arranged in such a way as to emit radial radiation in relation to the axis of the preform 12 in an emission plane.

When the preform 12 intersects the emission plane, it intersects certain rays emitted by upper cells 56, while other rays emitted by lower cells 56 pass below the base 13 of the preform 12. Each cell 56 comprises means for detecting whether its ray has been intersected by the preform 12.

It is possible to deduce therefrom the height of the preform 12 with a precision that is equal to the determined span between two cells 56.

As a variant of the invention, not shown, the measuring means consist of a stationary laser-sweeping sensor that makes it possible to measure the height of the preform or any other measuring means arranged in a stationary manner along the path, or mounted on the wheel.

The position of the bottom 15 is deduced from this measurement of height by taking into account the thickness of the base 13 of the preform 12. By combining the measurement of the total height of the preform 12 and the measurement of the thickness of the base 13 of the preform 12, the electronic control unit 44 is able to determine the specific position of the bottom 15 of the preform in relation to the transport wheel 34 by knowing the specific position of the collar 18 of the preform 12.

The thickness of the base 13 of the preform 12 is measured on, for example, a single preform 12 of the lot.

Actually, the thickness of 13 varies very little relative to the decrease in total height of the preform 12. The measured thickness is thus specific enough to be applied to each preform 12.

As a variant, the measuring means also comprise a sensor that can measure the thickness of the base of the preform. It is, for example, a confocal sensor or an interferometric sensor. According to other variants of the invention, not shown, any other known measuring means without contact of the position of the bottom of the preform in relation to its upper end can be used.

A method for serial treatment of the preforms 12 at the end of a preliminary operation for heating said preforms 12 by the heating station 20 is now described. During this method, all of the preforms 12 are successively treated by the different treatment stations 36.

The treatment method comprises successive stages "E1" for individual treatment of each preform 12 by the treatment device 30 produced according to the first embodiment of the invention.

With the treatment device 30 comprising multiple identical treatment stations 36, each preform 12 is treated by one of the treatment stations 36.

During each treatment stage "E1," the treatment rod 38 is inserted into the preform 12 that is loaded into the associated transport element 32 up to its extended position. The travel of the treatment rod 38 is adapted to said preform by the control means so that the free end 40 of the treatment rod 38 is stopped at the determined distance "D" from the bottom of said preform 12.

The treatment device 30 produced according to the teachings of the invention thus makes possible an adaptative travel of the actuating rod 38 based on the height of each preform 12.

To make possible the control of the travel of the treatment rod 38, the method also comprises successive stages "E0" for measuring the height of each hot preform 12.

Each stage "E0" for measuring a preform takes place before the beginning of the stage "E1" for treating said preform 12 for making it possible for the electronic control unit 44 to stop the treatment rod 38 at the determined distance from the bottom 15 of said preform 12.

For this purpose, the measuring means 56 communicate to the electronic control unit 44 the results of the measuring of said preform 12 so as to interrupt the operation of the electric actuator 42 when the free end 40 of the treatment rod 38 is at the determined distance "D" from the bottom 15 of said preform 12.

The application of the treatment method by the device 30 shown in FIG. 1 begins after a preform 12 has left the heating station 20; a measurement of its height is carried out by the measuring means 54 during the preliminary measuring stage "E0."

Then, said preform 12 is loaded onto one of the transport elements 32 of the transport wheel 34. The treatment rod 38 then occupies its retracted position.

The treatment stage "E1" of said preform 12 is then triggered. The electronic unit 44 activates the operation of the electric actuator 42 so as to make the treatment rod 38 slide toward its extended position.

Based on the measurement of the height of the preform 12 carried out during the preliminary measuring stage "E0," the electronic control unit 44 interrupts the operation of the electric actuator 42 to stop the sliding of the sliding rod 38 when its free end 40 arrives specifically at the determined distance "D" from the bottom 15 of the preform 12.

At the end of the treatment of the preform 12 by the treatment rod 38, the electronic control unit 44 again activates the operation of the electric actuator 42 to make the treatment rod 38 slide to its retracted position.

This method is repeated individually for each of the preforms 12 exiting from the heating station 20.

According to a second embodiment of the invention shown in FIG. 6, the control means 52 comprise detection means 58 that make it possible to detect when the free end 40 of the treatment rod 38 is at the determined distance "D" from the bottom 15 of the preform 12. These detection means 58 are mounted on the treatment rod 38.

The detection means 58 are able to communicate to the electronic control unit 44 a signal indicating that the free end 40 of the treatment rod 38 is at the determined distance "D" from the bottom 15 of the preform 12.

The detection means 58 consist of, for example, a capacitive condenser adapted to the determined distance "D" to be measured. The sensor is then arranged on the treatment rod 38, close to its free end 40.

As a variant, the detection of the distance between the free end of the treatment rod and the bottom of the preform is shaped by a sonar, or a radar, or any other device that can measure a distance without contact between the free end of the treatment rod and the bottom of the preform and can be mounted on the treatment rod.

The method for implementing the treatment device 30 according to the second embodiment of the invention is similar to that of the first embodiment of the invention. Only the differences will be described below, with the rest of the method remaining identical.

The method does not include the preliminary measuring stage.

By contrast, each stage "E1" for treatment of a preform 12 comprises an operation for detection of the bottom 15 of said preform 12, which is carried out during the sliding of the treatment rod 38 by the detection means 58.

Thus, based on the measurement made, the control unit 44 stops the treatment rod 38 at the determined distance "D" from the bottom 15 of said preform 12 by interrupting the operation of the electric actuator 42.

The treatment device 30 produced according to any of the embodiments of the invention thus makes it possible to adapt the sliding travel of the treatment rod 38 individually for each preform 12. This makes it possible in particular to treat the preforms 12 more effectively and more quickly while avoiding damaging the preforms 12 and/or the treatment rods 38.

The method that implements the treatment device 30 advantageously makes it possible to adapt the sliding travel of the treatment rod 38 to each hot preform 12, taking into consideration the unpredictable withdrawal caused by the heating of the preforms 12.

The treatment device described above can also be arranged upstream from the heating station. The treatment device can thus adapt the sliding travel of each treatment rod in the case of a dimensional anomaly in a lot of preforms. This makes it possible to avoid damaging the treatment rod by contact with the bottom of the preform that is shorter than the others.

The invention claimed is:

1. A treatment device (30) for serial treatment of hollow bodies made of thermoplastic material, in particular preforms (12) made of thermoplastic material, comprising:
   a plurality of individual transport elements (32), each transport element being arranged for transporting a hollow body;

a plurality of treatment rods (38), each treatment rod being associated with one of said transport elements (32), with each treatment rod (38) being mounted to slide axially in relation to the associated transport element (32) into the hollow body transported by passing through a neck (16) of said hollow body;

a means for individually determining, for each hollow body, an expected extended position in which the treatment rod needs to be inserted axially into said hollow body, said expected extended position being shorter than an inner length of the hollow body;

controlled means for moving each treatment rod (38) between a retracted position in which the treatment rod (38) is retracted above the hollow body transported by the transport element (32), and said extended position in which the treatment rod (38) is expected for that hollow body;

wherein the controlled means comprise a plurality of individual electric actuators (42), each treatment rod being moved individually by one individual electric actuator with the controlled interruption of the operation of each individual electric actuator (42) being controlled individually by an electronic control unit (44) for stopping the associated treatment rod (38) in said extended position determined for said hollow body.

2. The treatment device (30) according to claim 1, further comprising means for controlling the sliding travel of the treatment rod (38) to said extended position so that, in said extended position, a free end (40) of the treatment rod (38) is stopped at a determined axial distance (D) from a bottom (15) of the hollow body regardless of the axial dimension of the hollow body.

3. The treatment device (30) according to claim 1, wherein the control means comprise means (52) for measuring the axial height of said hollow body.

4. The treatment device (30) according to claim 2, wherein the treatment rod (38) comprises means (58) for detecting when a free end (40) of the treatment rod (38) is at the determined distance (D) from the bottom (15) of the preform (12).

5. The treatment device (30) according to claim 1, wherein the treatment rod (30) consists of a nozzle designed to inject a fluid into the hollow body.

6. The treatment device (30) according to claim 1, wherein the treatment rod (30) carries at a lower end a means for measuring the temperature.

7. The treatment device (30) according to claim 1, wherein the treatment rod (30) comprises emission means of a sterilizing electromagnetic radiation, for example electroluminescent diodes emitting ultraviolet radiation.

8. The treatment device (30) according to claim 1, further comprising a detection means for detecting when the free end (40) of the treatment rod (38) is at the determined distance from the bottom (15) of the preform (12).

9. The treatment device (30) according to claim 8, wherein the detection means comprises a capacitive condenser adapted to the determined distance.

10. A method for serial treatment of preforms (12) made of thermoplastic material at the end of a preliminary heating operation of the preforms (12), wherein the method comprises stages (E1) for individual treatment of each preform (12) by insertion of a treatment rod (38) into each preform (12) up to an extended position, with the travel of the treatment rod (38) being adapted to each of the preforms (12) by control means so that the free end (40) of the treatment rod (38) is stopped at a determined distance (D) from a bottom (15) of the preform (12).

11. The method according to claim 10, further comprising preliminary stages (E1) for measuring the height of each hot preform (12), with each, preliminary stage (EO) for measuring a preform (12) taking place before the beginning of the treatment stage (E1) of said preform (12) to make it possible for an electronic control unit (44) to stop the treatment rod (38) at the determined distance (D) from the bottom (15) of said preform (12).

12. The method according to claim 10, wherein each treatment stage (E1) comprises an operation for detecting the bottom (15) of said preform (12) that is produced during the sliding of the treatment rod (38) toward said extended position to make it possible for the electronic control unit (44) to stop the treatment rod (38) at the determined distance (D) from the bottom (15) of said preform (12).

* * * * *